(12) United States Patent
Tanaka et al.

(10) Patent No.: US 9,266,099 B2
(45) Date of Patent: Feb. 23, 2016

(54) REGENERATED HYDROCRACKING CATALYST AND METHOD FOR PRODUCING A HYDROCARBON OIL

(75) Inventors: Yuichi Tanaka, Tokyo (JP); Takuya Niitsuma, Tokyo (JP); Kazuhiko Tasaka, Tokyo (JP); Marie Iwama, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP)

(*) Notice: Subject to any disclaimer, the term of this patent is extended or adjusted under 35 U.S.C. 154(b) by 0 days.

(21) Appl. No.: 14/008,149

(22) PCT Filed: Mar. 26, 2012

(86) PCT No.: PCT/JP2012/057767
§ 371 (c)(1),
(2), (4) Date: Dec. 6, 2013

(87) PCT Pub. No.: WO2012/133319
PCT Pub. Date: Oct. 4, 2012

(65) Prior Publication Data
US 2014/0083907 A1    Mar. 27, 2014

(30) Foreign Application Priority Data
Mar. 31, 2011 (JP) ................. 2011-080597

(51) Int. Cl.
*B01J 38/02* (2006.01)
*B01J 29/12* (2006.01)
(Continued)

(52) U.S. Cl.
CPC .............. *B01J 29/126* (2013.01); *B01J 29/90* (2013.01); *B01J 38/04* (2013.01); *B01J 38/12* (2013.01);
(Continued)

(58) Field of Classification Search
CPC ........ B01J 29/126; B01J 29/12; C10G 45/70; C10G 45/60; C10G 11/18; C10G 47/18; C10G 2300/1048; C10G 2400/30; C10G 2300/301
USPC ...................................... 208/111.35
See application file for complete search history.

(56) References Cited

U.S. PATENT DOCUMENTS 3,344,059 A    9/1967   Engebretson
3,433,732 A *  3/1969   Leaman ................ 208/111.15
(Continued)

FOREIGN PATENT DOCUMENTS

AU    2007232039 B2    10/2007
EP    0 541 994         5/1993
(Continued)

OTHER PUBLICATIONS

Translation of the International Preliminary Report on Patentability for PCT/JP2012/057767, mailed on Oct. 17, 2013.
(Continued)

*Primary Examiner* — Randy Boyer
*Assistant Examiner* — Juan Valencia
(74) *Attorney, Agent, or Firm* — Greenblum & Bernstein, P.L.C.

(57) ABSTRACT

The regenerated hydrocracking catalyst according to the present invention is a regenerated hydrocracking catalyst prepared by regenerating a used hydrocracking catalyst including: a catalyst support containing zeolite and an amorphous composite metal oxide having solid acidity; and at least one active metal supported by the catalyst support, selected from noble metals of Group 8 to Group 10 in the periodic table, wherein the regenerated hydrocracking catalyst contains 0.05 to 1% by mass of a carbonaceous substance in terms of carbon atoms based on the entire mass of the catalyst.

16 Claims, 2 Drawing Sheets

(51) Int. Cl.
  *B01J 29/90* (2006.01)
  *B01J 38/04* (2006.01)
  *B01J 38/12* (2006.01)
  *B01J 38/56* (2006.01)
  *C10G 47/18* (2006.01)

(52) U.S. Cl.
  CPC ............... *B01J 38/56* (2013.01); *C10G 47/18* (2013.01); *B01J 2229/18* (2013.01); *B01J 2229/20* (2013.01); *B01J 2229/42* (2013.01); *C10G 2300/1022* (2013.01)

(56) References Cited

U.S. PATENT DOCUMENTS

| | | | |
|---|---|---|---|
| 4,632,914 A * | 12/1986 | Arias et al. ............... | 502/211 |
| 4,859,308 A | 8/1989 | Harandi et al. | |
| 5,908,804 A | 6/1999 | Menon et al. | |
| 7,304,012 B2 | 12/2007 | Green et al. | |
| 8,002,970 B2 | 8/2011 | Euzen et al. | |
| 2005/0148456 A1 | 7/2005 | Dufresne et al. | |
| 2005/0250863 A1 | 11/2005 | Green et al. | |
| 2006/0231464 A1 | 10/2006 | Brignac et al. | |
| 2009/0118556 A1 | 5/2009 | Euzen et al. | |
| 2010/0300933 A1* | 12/2010 | Tanaka ..................... | 208/62 |
| 2011/0180455 A1* | 7/2011 | Bouchy et al. ............ | 208/49 |
| 2012/0160738 A1 | 6/2012 | Konno et al. | |

FOREIGN PATENT DOCUMENTS

| | | | |
|---|---|---|---|
| EP | 0541994 | * | 5/1993 |
| EP | 1 733 789 | | 12/2006 |
| JP | 1-279993 | | 11/1989 |
| JP | H08-173817 | | 7/1996 |
| JP | 2004-323626 | | 11/2004 |
| JP | 2005-279382 | | 10/2005 |
| JP | 2005-529744 | | 10/2005 |
| JP | 2007-204506 | | 8/2007 |
| JP | 2007-270067 | | 10/2007 |
| JP | 2008-138187 | | 6/2008 |
| JP | 2008-525174 | | 7/2008 |
| JP | 2008-536977 | | 9/2008 |
| JP | 2011-031194 | | 2/2011 |
| WO | 2011/004690 | | 1/2011 |

OTHER PUBLICATIONS

International Search Report for PCT/JP2012/057767, mailed on Jun. 19, 2012.
Office Action for Chinese Patent Application No. 201280015492.0, which is dated Jul. 30, 2014.
Extended European Search Report of EP Patent Application No. 12765364.0 mailed Oct. 6, 2014.
Notice of Allowance for JP Patent Application No. 2011-080597 mailed Nov. 11, 2014.

* cited by examiner

REGENERATED HYDROCRACKING CATALYST AND METHOD FOR PRODUCING A HYDROCARBON OIL

TECHNICAL FIELD

The present invention relates to a regenerated hydrocracking catalyst and a process for producing a hydrocarbon oil using the regenerated hydrocracking catalyst.

BACKGROUND ART

Recently, from the viewpoint of increase in environmental consciousness, liquid fuels in which the contents of substances such as sulfur and aromatic hydrocarbons are small have been demanded. From such a viewpoint, as a technique that can produce a base stock for fuel oil that substantially contains neither sulfur nor aromatic hydrocarbon, and is rich in aliphatic hydrocarbons, and particularly a base stock for kerosene and gas oil, a technique in which a synthesis gas (mixed gas containing carbon monoxide gas and hydrogen gas as a main component) is produced from a hydrocarbon raw material such as natural gas by a reforming reaction, hydrocarbons are produced from the synthesis gas by a Fischer-Tropsch synthesis reaction (hereinafter, also referred to as an "FT synthesis reaction" in some cases.), and further the hydrocarbons are refined by hydroprocessing and fractionation to obtain a base stock for fuel oil has been attracting attention (for example, see Patent Literature 1.). The technique is referred to as a GTL (Gas To Liquids) process.

An synthetic oil obtained from the synthesis gas by the FT synthesis reaction (hereinafter, also referred to as an "FT synthetic oil" in some cases.) is a mixture containing aliphatic hydrocarbons having a wide carbon number distribution as a main component; the FT synthetic oil can be fractionated depending on a boiling point to obtain a naphtha fraction, a middle distillate fraction, and a wax fraction. Moreover, of the respective fractions, the middle distillate is the most useful fraction corresponding to the base stock for kerosene and gas oil, and it is desired that the middle distillate be obtained at a high yield.

A relative amount of the wax fraction contained with the middle distillate in the FT synthetic oil is hydrocracked; thereby, hydrocarbons whose boiling point is in the range of the boiling point equivalent to that of the middle distillate can be obtained; using the method, the useful middle distillate can be obtained from the FT synthetic oil at a high yield.

In hydrocracking of a hydrocarbon raw material oil containing the wax fraction, in order to increase the yield of the middle distillate, the cracking rate of the wax fraction needs to be increased; on the other hand, if the cracking rate is increased, there is a problem such that production of a light fraction due to excessive hydrocracking is increased while the yield of the middle distillate is reduced. Accordingly, it is demanded that a hydrocracking catalyst used for hydrocracking of a hydrocarbon raw material oil containing the wax fraction have a high hydrocracking activity, and simultaneously suppress production of a light fraction due to excessive hydrocracking to produce the middle distillate at a high selectivity. As such a hydrocracking catalyst, catalysts comprising: a catalyst support containing zeolite and an amorphous composite metal oxide having solid acidity; and an active metal supported by the catalyst support, selected from noble metals of Group 8 to Group 10 in the periodic table are known (for example, see Patent Literature 2 and Patent Literature 3.).

Usually, when the hydrocracking catalyst is packed in a reactor and operation of hydrocracking of the raw material oil containing the wax fraction is performed, the activity of the catalyst is reduced with a lapse of the operating time. Then, if the activity of the catalyst is reduced to a predetermined level, the operation of the hydrocracking step is stopped, and the catalyst is replaced. Moreover, the used hydrocracking catalyst taken out from the reactor (hereinafter, also referred to as a "used hydrocracking catalyst" or simply referred to as a "used catalyst" in some cases.) is regenerated and reused; thereby, cost needed for an expensive catalyst can be reduced, and disposal of the used catalyst as wastes can be avoided.

In the conventional regeneration of the hydrocracking catalyst, the used catalyst is calcined to remove substantially all the carbonaceous substances produced and deposited on the catalyst in the hydrocracking step, which are counted as a main cause of reduction in the activity.

CITATION LIST

Patent Literature

[Patent Literature 1] Japanese Patent Application Laid-Open Publication No. 2004-323626
[Patent Literature 2] Japanese Patent Application Laid-Open Publication No. 2005-279382
[Patent Literature 3] Japanese Patent Application Laid-Open Publication No. 2007-204506

SUMMARY OF INVENTION

Technical Problem

On the other hand, in the conventional hydrocracking catalyst obtained by regenerating the used catalyst (hereinafter, also referred to as a "regenerated hydrocracking catalyst" or simply referred to as a "regenerated catalyst" in some cases.), while the activity at an initial stage of the operation is relatively high, the activity is greatly reduced with a lapse of the operating time. Particularly, reduction in the activity of the catalyst is large at the initial stage of the operation from a start of the operation to the operating time until approximately 500 hours has passed; after that, the activity in the so-called "stable phase" during which mild reduction in the activity is continued is low. Moreover, the selectivity of the middle distillate at the stable phase (a proportion of the middle distillate in all the hydrocracked products) is low, and the yield of the middle distillate is insufficient.

In order to effectively utilize a regenerated catalyst that is advantageous with respect to cost, and can suppress discharge of wastes, it has been demanded that a regenerated catalyst that can provide the middle distillate at a higher yield than that of the conventional regenerated catalyst be provided. The life of the hydrocracking catalyst is undesirably reduced only if the reaction temperature is raised in order to compensate for the reduced cracking rate; for this reason, in order to stably obtain a large amount of the middle distillate for a long period of time, it is desirable that properties of the catalyst at the stable phase be improved. However, a method for satisfying the above demand in the regenerated hydrotreating catalyst has not been sufficiently examined yet.

The present invention has been made in consideration of the circumstances above, and an object of the present invention is to provide a regenerated hydrocracking catalyst, and a process for producing a hydrocarbon oil using the regenerated hydrocracking catalyst in which a middle distillate can be obtained at a high yield at a stable phase in hydrocracking of a hydrocarbon raw material oil containing a wax fraction for a purpose of production of the middle distillate.

Solution to Problem

As a result of extensive research by the present inventors in order to solve the problems above, it was found out that a specific regenerated hydrocracking catalyst containing a specific amount of a carbonaceous substance sufficiently has activity for proper hydrocracking of hydrocarbons in a wax fraction while activity for excessive hydrocracking is suppressed; further such properties are maintained at a stable phase of the catalyst, and a yield of the middle distillate can be increased; and based on the knowledge, the present invention has been completed.

Namely, the present invention provides a regenerated hydrocracking catalyst prepared by regenerating a used hydrocracking catalyst comprising; a catalyst support containing zeolite and an amorphous composite metal oxide having solid acidity; and at least one active metal supported by the catalyst support, selected from noble metals of Group 8 to Group 10 in the periodic table, wherein the regenerated hydrocracking catalyst contains 0.05 to 1% by mass of a carbonaceous substance in terms of carbon atoms based on the entire mass of the catalyst.

According to the regenerated hydrocracking catalyst according to the present invention having the configuration above, in the hydrocracking of the hydrocarbon raw material oil containing the wax fraction, sufficient selectivity of the middle distillate can be maintained even at the stable phase of the catalyst, and the middle distillate can be obtained at a high yield for a long period of time.

In the regenerated hydrocracking catalyst according to the present invention, it is preferable that the zeolite be an ultra stable Y zeolite. In the case where the hydrocracking catalyst is used for hydrocracking of the hydrocarbon raw material oil containing the wax fraction, the middle distillate can be obtained at a higher yield at the stable phase.

Moreover, in the regenerated hydrocracking catalyst according to the present invention, it is preferable that the amorphous composite metal oxide be at least one selected from silica alumina, alumina boria, and silica zirconia. In the case where the hydrocracking catalyst is used for hydrocracking of the hydrocarbon raw material oil containing the wax fraction, the middle distillate can be obtained at a higher yield at the stable phase.

Moreover, in the regenerated hydrocracking catalyst according to the present invention, it is preferable that the active metal be platinum. In the case where the hydrocracking catalyst is used for hydrocracking of the hydrocarbon raw material oil containing the wax fraction, the middle distillate can be obtained at a higher yield at the stable phase.

The present invention also provides a process for producing a hydrocarbon oil, the method comprising contacting a raw material oil containing 70% by mass or more of linear aliphatic hydrocarbons with a boiling point of higher than 360° C. with the regenerated hydrocracking catalyst according to the present invention in the presence of molecular hydrogen.

According to the process for producing a hydrocarbon oil according to the present invention, using the regenerated hydrocracking catalyst according to the present invention, the middle distillate can be obtained at a high yield from the raw material oil for a long period of time.

In the process for producing a hydrocarbon oil according to the present invention, it is preferable that the raw material oil be a synthetic oil obtained by the Fischer-Tropsch synthesis reaction. Using the synthetic oil obtained by the Fischer-Tropsch synthesis reaction as the raw material oil, a middle distillate containing neither sulfur nor aromatic hydrocarbon can be obtained at a high yield.

Advantageous Effects of Invention

According to the present invention, by a regenerated hydrocracking catalyst that is advantageous with respect to cost, the middle distillate can be obtained at a high yield from the hydrocarbon raw material oil containing the wax fraction for a long period of time.

DESCRIPTION OF EMBODIMENTS

First, a preferred embodiment of a regenerated hydrocracking catalyst according to the present invention will be described.

The regenerated hydrocracking catalyst according to the present embodiment is prepared by regenerating a used hydrocracking catalyst comprising: a catalyst support containing zeolite and an amorphous composite metal oxide having solid acidity; and at least one active metal supported by the catalyst support, selected from noble metals of Group 8 to Group 10 in the periodic table, wherein the used hydrocracking catalyst contains 0.05 to 1% by mass of a carbonaceous substance in terms of carbon atoms based on the entire mass of the catalyst.

The regenerated hydrotreating catalyst according to the present embodiment is produced by regenerating the used hydrocracking catalyst. The used hydrocracking catalyst and reproduction thereof will be described in detail later.

The catalyst support that constitutes the regenerated hydrocracking catalyst according to the present embodiment contains a zeolite. The zeolite is preferably an ultra stable Y zeolite (USY zeolite), Y zeolite, mordenite, β zeolite, and the like. Among these, USY zeolite is particularly preferred.

The average particle size of the USY zeolite is not particularly limited, and is preferably not larger than 1.0 and more preferably not larger than 0.5 μm. Moreover, in the USY zeolite, it is preferable that the molar ratio of silica/alumina (the molar ratio of silica to alumina) be 10 to 200, it is more preferable that the molar ratio of silica units/alumina units be 15 to 100, and it is still more preferable that the molar ratio of silica units/alumina units be 20 to 60.

The catalyst support contains an amorphous composite metal oxide having solid acidity. The amorphous composite metal oxide comprises a combination of two or three or more selected from metal oxide units such as alumina, silica, titania, zirconia, boria, and magnesia, for example. Specific examples of the amorphous composite metal oxide having solid acidity include, silica alumina, silica zirconia, alumina boria, alumina zirconia, silica titania, and silica magnesia. Among these, silica alumina, alumina boria, and silica zirconia are preferable, and silica alumina and alumina boria are more preferable.

The catalyst support is preferably those containing the USY zeolite and one or more selected from silica alumina, alumina boria, and silica zirconia, and is more preferably those comprising the USY zeolite and silica alumina and/or alumina boria.

Moreover, the catalyst support preferably comprises 0.1 to 20% by mass of the zeolite and 10 to 99.5% by mass of the amorphous composite metal oxide having solid acidity.

Moreover, when the catalyst support comprises the USY zeolite, it is preferable that the proportion of the USY zeolite to be compounded be 0.1 to 10% by mass based on the entire mass of the catalyst support, and it is more preferable that the proportion of the USY zeolite to be compounded be 0.5 to 5% by mass based on the entire mass of the catalyst support.

When the catalyst support comprises the USY zeolite and silica alumina, it is preferable that the ratio of the USY zeolite to silica alumina to be compounded (USY zeolite/silica alumina) be 0.03 to 1 in a mass ratio.

Further, when the catalyst support comprises the USY zeolite and alumina boria, it is preferable that the ratio of the USY zeolite to alumina boria to be compounded (USY zeolite/alumina boria) be 0.03 to 1 in a mass ratio.

The catalyst support may contain a binder other than the zeolite and the amorphous composite metal oxide having solid acidity. The binder is not particularly limited, and alumina, silica, titania, and magnesia are preferable, and alumina is more preferable. It is preferable that the amount of the binder to be compounded be 20 to 98% by mass based on the entire mass of the catalyst support, and it is more preferable that the amount of the binder to be compounded be 30 to 96% by mass based on the entire mass of the catalyst support.

The catalyst support is preferably molded. The shape of the molded catalyst support is not particularly limited, and examples of the shape include a sphere, a cylinder, an irregular cylinder having a trilobes or quadrolobes, and a disc. A method for molding a catalyst support is not limited, and a known method such as extrusion molding and compression molding is used. The molded catalyst support is usually calcined.

In the regenerated hydrocracking catalyst according to the present embodiment, the active metal supported by the catalyst support is at least one selected from noble metals of Group 8 to Group 10 in the periodic table. Specific examples of the metal include ruthenium and osmium as the noble metal of Group 8, rhodium and iridium as the noble metal of Group 9, and palladium and platinum as the noble metal of Group 10. Among these, preferable noble metals are platinum and palladium, and more preferable is platinum. Moreover, a combination of platinum-palladium is preferably used. Here, the periodic table refers to the long form of the periodic table of the elements according to the specification by IUPAC (International Union of Pure and Applied Chemistry).

In the regenerated hydrocracking catalyst according to the present embodiment, it is preferable that the content of the active metal supported by the catalyst support be 0.1 to 3% by mass in terms of a metal atom based on the mass of the catalyst support. In the case where the content of the active metal is less than the lower limit value, hydrocracking is likely not to sufficiently proceed. On the other hand, in the case where the content of the active metal is more than the upper limit value, dispersion of the active metal is likely to be decreased to reduce the activity of the catalyst, and cost of the catalyst is increased.

The regenerated hydrocracking catalyst according to the present embodiment contains 0.05 to 1% by mass of a carbonaceous substance in terms of carbon atoms based on the entire mass of the catalyst. The carbonaceous substance comprises carbon atoms, or carbon atoms and a small amount of hydrogen atoms and/or oxygen atoms and the like, and includes carbonaceous substances whose structure is not clearly specified. Specifically, although the details will be given later in the description of the method for producing the regenerated hydrocracking catalyst, the carbonaceous substance includes those obtained by calcining carbonaceous substances produced and deposited on the hydrocracking catalyst in hydrocracking the hydrocarbon raw material containing the wax fraction, or those obtained by attaching an organic compound to the regenerated hydrocracking catalyst once and carbonizing the product.

In the case where the content of the carbonaceous substance in the catalyst is less than 0.05% by mass, the activity for the excessive hydrocracking that the regenerated hydrocracking catalyst has cannot be sufficiently suppressed, and it is likely to be difficult to improve the selectivity of the middle distillate in a produced oil. On the other hand, in the case where the content of the carbonaceous substance is more than 1% by mass, reduction in the activity of the regenerated hydrocracking catalyst for the hydrocracking is remarkable, the reaction temperature in the hydrocracking needs to be increased in order to maintain a predetermined cracking rate, and the life of the catalyst is likely to be reduced.

As a method for determining the carbonaceous substance in the regenerated hydrocracking catalyst according to the present embodiment, a method in which a sample of the catalyst is heated by a high frequency in an oxygen stream to calcine the carbonaceous substance, and the amount of the carbon dioxide in exhaust gas is determined by a detector using infrared absorption (for example, a carbon and sulfur analyzer EMIA-920V made by HORIBA, Ltd.) is employed.

Next, the method for producing the regenerated hydrocracking catalyst according to the present embodiment will be described below using two embodiments as examples.

First, a first embodiment of the method for producing the regenerated hydrocracking catalyst according to the present embodiment will be described. The method according to the first embodiment is a method in which in a calcination step performed when the used hydrocracking catalyst is subjected to regeneration, a predetermined amount of the carbonaceous substance is contained in the used hydrocracking catalyst.

First, a method for producing a new (unused) hydrocracking catalyst as a base for the hydrocracking catalyst according to the present embodiment will be described. The configuration of the catalyst support and active metal that the new hydrocracking catalyst contains is the same as that in the regenerated hydrocracking catalyst according to the present embodiment.

First, a mixture of the zeolite, the amorphous composite metal oxide having solid acidity or a gel thereof, the binder, and a liquid such as water when necessary is kneaded to prepare a clay-like kneaded product.

Next, the kneaded product is extrusion molded to obtain a molded product, and the molded product is further dried at 70 to 150° C., for example.

Next, the dried molded product is calcined to obtain a catalyst support. At this time, a calcination condition is selected such that mechanical strength of the catalyst support obtained by calcination is manifested sufficiently. As the calcination condition for the catalyst support, a combination of various calcination temperatures and various calcination times can be set; for example, as the calcination temperature, the range of 300 to 550° C. is preferable, and the range of 350 to 500° C. is more preferable. Moreover, as the calcination time, the range of approximately 0.1 to 10 hours is preferable, and the range of approximately 0.2 to 8 hours is more preferable.

Next, a compound containing the active metal element is supported by the thus-obtained catalyst support. The compound containing these noble metal elements used for supporting is not particularly limited as long as the compound contains the noble metal element, and a known compound is used; inorganic or organic compounds soluble to a solvent, particularly water are used. Specific examples of the compound containing the active metal element include $RuCl_3$ in the case where the noble metal is ruthenium; $OsCl_3.3H_2O$ and $(NH_4)_2[OsCl_6]$ in the case where the noble metal is osmium; $RhCl_3.3H_2O$ in the case where the noble metal is rhodium; $H_2IrCl_6.6H_2OH$ in the case where the noble metal is iridium; $(NH_4)_2PdCl_6$, $Pd(NH_3)_4Cl_2.H_2O$, and $Pd(C_2H_5CO_2)_2$ in the case where the noble metal is palladium; and $PtCl_2$, $H_2PtCl_6$, $(NH_4)_2PtCl_6$, $H_2Pt(OH)_6$, $Pt(NH_3)_4Cl_2.H_2O$, and $Pt(C_5H_7O_2)_2$ in the case where the noble metal is platinum.

Supporting of the compound containing these active metal elements is performed by a known method. Namely, a method for impregnating a solution, preferably an aqueous solution of the compound with the molded catalyst support, a method for performing ion exchange, and the like are preferably used. The impregnation method is not particularly limited, and the incipient wetness method and the like are preferably used.

Next, the catalyst support which supports the compound containing the active metal element by the method is dried. Drying can be performed at a temperature of approximately 70 to 150° C., for example.

The thus-obtained catalyst support which supports the compound containing the active metal element (hereinafter, also referred to as a "catalyst precursor" in some cases.) is calcined to obtain a hydrocracking catalyst. In the calcination of the catalyst precursor, components other than the active metal atom, namely, counter ions, ligands, and the like are removed from the compound containing the active metal element supported by the catalyst support.

As a calcination condition for the catalyst precursor, a combination of various calcination temperatures and various calcination times can be set; for example, as the calcination temperature, the range of 300 to 550° C. is preferable, and the range of 350 to 530° C. is more preferable. Moreover, as the calcination time, the range of approximately 0.1 to 10 hours is preferable, and the range of approximately 0.2 to 8 hours is more preferable.

Thus, a new (unused) hydrocracking catalyst as a base for the hydrocracking catalyst according to the present embodiment is obtained.

Next, an outline of a process in which the hydrocracking of the raw material oil containing the wax fraction using the hydrocracking catalyst is performed to produce the used hydrocracking catalyst will be described.

The thus-obtained hydrocracking catalyst is packed in a hydrocracking reactor, and usually reduced by molecular hydrogen (hydrogen gas) to activate the catalyst. Subsequently, a raw material oil containing hydrocarbons of a wax fraction derived from the FT synthetic oil is fed to the hydrocracking reactor with hydrogen gas, and the hydrocracking is started. The reaction temperature is set such that a cracking rate, which is an index indicating a degree of proceed of hydrocracking described later, is a predetermined value.

After the operation is started, the activity of the hydrocracking catalyst is reduced with a lapse of the operating time. Although the cause of reduction in the activity is not clear, an oxygen-containing compound contained in the raw material oil as a byproduct in the FT synthesis reaction, weak poisoning action caused by water produced by hydro-deoxidation of the oxygen-containing compound, deposition of the carbonaceous substance produced on the catalyst, and further aggregation of the active metal caused because the catalyst is exposed to a high temperature (reaction temperature) for a long time are thought as the cause. In the reduction in the activity, in order to maintain the cracking rate at the predetermined value through the operation period, an operation to increase the reaction temperature in a range in which the catalyst activity reduced with a lapse of the operating time is compensated is performed. Then, at a point of time when the reaction temperature reaches the upper limit temperature determined with respect of heat resistance of the reactor, increase in the excessive hydrocracking that leads to production of the light fraction, or the like, the operation of the hydrocracking reactor is stopped.

After the operation is stopped, the inside of the reactor is washed by a liquid hydrocarbon at normal temperature lighter than the wax fraction such as the middle distillate or naphtha fraction derived from the FT synthetic oil to remove the wax fraction within the reactor. Subsequently, the inside of the reactor is purged with an inert gas such as nitrogen gas, and cooled; then, the reactor is opened to take out the packed hydrocracking catalyst. The taken out catalyst is the used hydrocracking catalyst (used catalyst).

In the above description, while an example in which the new (unused) hydrocracking catalyst is packed in the hydrocracking reactor has been shown in the beginning, the regenerated catalyst may be packed instead of the unused catalyst. In this case, if it is determined that the catalyst (used catalyst) taken out from the reactor after the operation is stopped can be reused by regenerating the catalyst again, regeneration may be performed. Namely, the regenerated catalyst according to the present embodiment includes catalysts used several times and those regenerated several times. In the description below, unless otherwise specified, an example of the used hydrocracking catalyst obtained from the unused hydrocracking catalyst will be described.

Next, the regeneration of the used catalyst produced as described above will be described. The regeneration mainly comprises a carbon measuring step of measuring the content of the carbonaceous substance contained in the used catalyst and deposited in the catalyst in the hydrocracking step, a deoiling step, and a calcination step.

In the carbon measuring step, for example, a collected sample of the used catalyst is washed by a low boiling point hydrocarbon solvent such as hexane to remove hydrocarbons that are the remaining raw material oil in the hydrocracking step and the produced oil thereof; the solvent is removed by drying under reduced pressure or the like; the thus-obtained sample is fed for the method for determining the carbonaceous substance to determine the amount of the carbonaceous substance in the catalyst. In the case where using a highly volatile hydrocarbon such as naphtha, the wax fraction is sufficiently removed at the time of washing the reactor by a light hydrocarbon after the operation of the hydrocracking reactor is stopped, washing by the solvent may be omitted, and drying under reduced pressure or the like may be directly performed. The result of measurement of carbon can be used in determination of the condition in the calcination step. The content of the remaining hydrocarbon in the used catalyst can also be determined from change in the mass of the sample before and after washing by the solvent and drying under reduced pressure, and the result can be used in determination of the condition in the deviling step.

The deoiling step is a step of heating the used catalyst under an inert stream such as nitrogen gas, preferably under a nitrogen stream to remove at least part of the hydrocarbon contained in the catalyst and used for washing after the operation of the hydrocracking reactor is stopped.

As the condition in the deoiling step, a combination of various temperatures and times can be set; it is preferable that the condition in the deoiling step be determined considering the kind of the remaining hydrocarbon in the used catalyst and the content thereof determined in the carbon measuring step. For example, as the calcination temperature, the range of 250 to 550° C. is preferable, and the range of 280 to 500° C. is more preferable. Moreover, as the deoiling time, the range of approximately 0.2 to 10 hours is preferable, and the range of approximately 0.5 to 8 hours is more preferable. If the deoiling in the deoiling step is insufficient, the remaining hydrocarbon in the catalyst may make a rapid oxidation reaction (combustion) in the subsequent calcination step. In this case, a substantial temperature of the catalyst may be excessively raised with respect to the calcination temperature to be set, leading to aggregation of the active metal in the catalyst, and reducing the activity of the regenerated hydrocracking catalyst. Moreover, the carbonaceous substance in the used catalyst may be calcined and lost, and a predetermined amount of the carbonaceous substance may not remain in the regenerated hydrocracking catalyst.

Next, the deoiled used catalyst is fed to the calcination step. In the calcination step, the carbonaceous substance contained in the used catalyst and produced and deposited on the catalyst in the hydrocracking step is removed by decomposition by oxidation such that the content of the carbonaceous substance contained in the regenerated hydrotreating catalyst according to the present embodiment is not more than the upper limit value according to the present invention, and simultaneously, adjustment is performed such that the content of the carbonaceous substance does not fall below the lower limit value according to the present invention. Moreover, the hydrocarbon that remains in the catalyst through the deoiling step is decomposed by oxidation, and removed. In the case where the amount of the carbonaceous substance contained in the used catalyst is smaller than the amount equivalent to the content of the carbonaceous substance in the target regenerated hydrotreating catalyst, the carbonaceous substance may be newly produced by carbonization of the hydrocarbon contained in the used catalyst. The content of the carbonaceous substance obtained by the calcination step in the regenerated hydrotreating catalyst is 0.05 to 1% by mass in terms of carbon atoms.

As the condition in the calcination step, a combination of various temperatures and times can be set, and it is preferable that the condition be determined considering the amount of the carbonaceous substance in the used catalyst determined in the carbon measuring step. For example, as the calcination temperature, the range of 300 to 550° C. is preferable, and the range of 350 to 530° C. is more preferable. Moreover, as the calcination time, the range of approximately 0.1 to 10 hours is preferable, and the range of approximately 0.2 to 8 hours is more preferable.

The noble metal such as platinum and palladium has a catalyst activity for the oxidation reaction. For this reason, in the calcination step, oxidation of the carbonaceous substance contained in the used catalyst easily proceeds even at a relatively low temperature. Moreover, the substantial temperature of the catalyst may be raised by the reaction heat of the oxidation, and the oxidation may rapidly proceed, namely, the carbonaceous substance may be combusted. In this case, the content of the carbonaceous substance to be obtained in the regenerated hydrotreating catalyst cannot be controlled; all the carbonaceous substance is likely to be combusted, or a catalyst containing a smaller content of the carbonaceous substance than the predetermined value is likely to be obtained. Further, in this case, if the substantial temperature of the catalyst exceeds the set calcination temperature and is largely raised by the combustion heat, the active metal is likely to aggregate to reduce the activity of the regenerated hydrotreating catalyst to be obtained. In order to prevent occurrence of such a rapid oxidation reaction, it is preferable that in the calcination step, in at least the initial stage thereof, a condition be selected in which the rapid oxidation of the carbonaceous substance is suppressed, and the oxidation mildly proceeds. Specifically, it is preferable that the deoiled used catalyst be placed in a heater for calcination; when the temperature is raised to the set calcination temperature, heating rate be sufficiently small at least in the range of the temperature at which the oxidation of the carbonaceous substance proceeds (for example, approximately 250 to 400° C.) to prevent occurrence of the rapid oxidation reaction during the heating process. Such a heating rate is, for example, 1 to 50° C./h, and preferably approximately 5 to 30° C./h.

Moreover, it is preferable that calcination of the catalyst precursor be performed in two stages. Namely, this is a method in which at a first stage, calcination is performed on the condition of a lower temperature such that the oxidation of the carbonaceous substance mildly proceeds; at a stage in which the oxidation proceeds, and the amount of the remaining carbonaceous substance is reduced to an extent that the rapid oxidation does not proceed, calcination is performed on the condition of a higher temperature as a second stage to control the content of the carbonaceous substance in the catalyst. In this case, as the calcination temperature at the first stage, for example, the range of 250 to 400° C. is selected, and as the second calcination temperature, for example, the range of 350 to 550° C. is selected.

As described above, the regenerated hydrotreating catalyst according to the present embodiment is obtained.

Next, a second embodiment of the method for producing a regenerated hydrocracking catalyst according to the present embodiment will be described. The method according to the second embodiment is a method in which the used catalyst is regenerated by the conventional regeneration method to produce a regenerated hydrotreating catalyst containing substantially no carbonaceous substance once; the catalyst is impregnated into an organic compound, and calcined or heat treated to contain a predetermined amount of the carbonaceous substance in the catalyst.

The used catalyst used for the method according to the second embodiment is the same as that used for the method according to the first embodiment.

The carbon measuring step and the deoiling step (first cleaning step) are performed on the used catalyst in the same manner as in the method according to the first embodiment.

The deoiled used catalyst is fed to the calcination step (first calcination step). In the first calcination step, removal of the carbonaceous substance by decomposition by oxidation is performed such that the carbonaceous substance in the used catalyst does not substantially remain.

As the condition of the first calcination step, a combination of various temperatures and times can be set, and it is preferable that the condition be determined considering the amount of the carbonaceous substance in the used catalyst determined in the carbon measuring step. For example, as the calcination temperature, the range of 350 to 600° C. is preferable, and the range of 400 to 550° C. is more preferable. Moreover, as the calcination time, the range of approximately 0.1 to 10 hours is preferable, and the range of approximately 0.2 to 8 hours is more preferable.

In the first calcination step, the rapid oxidation of the carbonaceous substance is preferably prevented by performing the adjustment of the heating rate when the temperature is raised or the two-stage calcination, which are described in the description of the calcination step according to the first embodiment.

The catalyst once regenerated through the calcination step as above (referred to as a "pre-regenerated catalyst.") is impregnated into a liquid organic compound. The liquid organic compound is not particularly limited as long as it does not contain sulfur, nitrogen, halogen, and the like that are catalyst poison; it is preferable that the liquid organic compound be a liquid hydrocarbon, and for example, the naphtha fraction, the kerosene fraction, the gas oil fraction, and the like produced by the GTL process are suitably used. A method for impregnating the pre-regenerated catalyst into these liquid organic compounds is not particularly limited.

The pre-regenerated catalyst impregnated into the liquid organic compound is taken out from the organic compound, and subjected to a deoiling step (second deoiling step) in inert gas, preferably in nitrogen gas. By the second deoiling step, an excessive organic compound attaching to the pre-regenerated catalyst by impregnation is volatilized. The condition in the second deoiling step is properly determined in the range of temperature of approximately 180 to 500° C. and in the range of time of approximately 0.1 to 10 hours in consideration of the organic compound to be impregnated or the like.

Next, the deoiled pre-regenerated catalyst is fed to a calcination step (second calcination step) under an atmosphere containing molecular oxygen, and preferably under an air atmosphere, and the organic compound that remains in the pre-regenerated catalyst, such as gas oil, is carbonized to produce the carbonaceous substance. The calcination condition can be properly set according to the organic compound to be used, the content of the organic compound that remains in the pre-regenerated catalyst after the deoiling step, the content of the carbonaceous substance to be contained in the target regenerated hydrocracking catalyst according to the present embodiment, and the like. For example, as the calcination temperature, the range of 300 to 550° C. is preferable, and the range of 350 to 530° C. is more preferable. As the calcination time, approximately 0.1 to 10 hours are preferable, and approximately 0.2 to 8 hours are more preferable. Thus, the carbonaceous substance is produced in the regenerated catalyst such that the content thereof is 0.05 to 1% by mass in terms of carbon atoms.

Instead of the second calcination step in the above example, heat treatment may be performed under an atmosphere of an inert gas such as nitrogen gas to carbonize the organic compound attaching to the pre-regenerated catalyst and produce a predetermined amount of the carbonaceous substance in the regenerated catalyst.

Thus, the regenerated hydrotreating catalyst according to the present embodiment can be obtained.

Next, a process for producing a hydrocarbon oil according to the present invention will be described.

The process for producing a hydrocarbon oil according to the present invention comprises the step of contacting a raw material oil containing 70% by mass or more of linear aliphatic hydrocarbons whose boiling point is higher than 360° C. with the regenerated hydrocracking catalyst according to the present embodiment in the presence of molecular hydrogen. By the process, the raw material oil is hydrocracked.

Hereinafter, using an example of the GTL process in which the process for producing a hydrocarbon oil according to the present invention is preferably used, an embodiment of the process for producing a hydrocarbon oil according to the present invention will be described.

Figure 1:
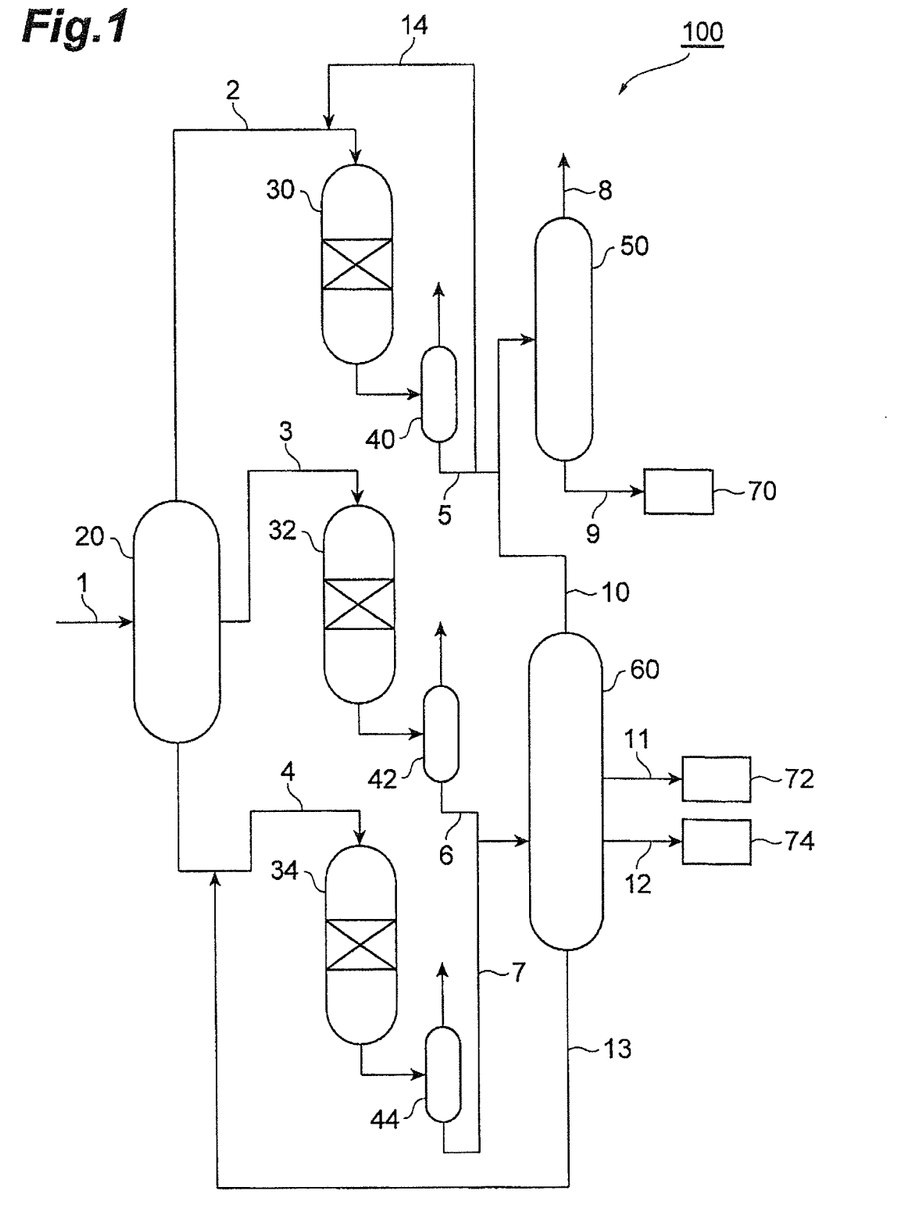
FIG. 1 is a schematic configuration diagram showing an apparatus for producing a hydrocarbon oil in which one embodiment of a process for producing a hydrocarbon oil according to the present invention is implemented.

FIG. 1 is a schematic configuration diagram showing a production facility equivalent to an upgrading unit in the GTL process including an apparatus for producing a hydrocarbon oil in which one embodiment of the process for producing a hydrocarbon oil according to the present invention is implemented.

First, with reference to FIG. 1, an apparatus for producing naphtha and a base stock for kerosene and gas oil from hydrocarbons obtained by the FT synthesis reaction (FT synthetic oil) will be described in which a suitable embodiment of the process for producing a hydrocarbon oil according to the present invention is implemented.

An apparatus for producing a hydrocarbon oil 100 shown in FIG. 1 receives the FT synthetic oil through Line 1 from the FT synthesis reactor that synthesizes a hydrocarbon oil (FT synthetic oil) by the FT synthesis reaction using a synthesis gas (a mixed gas of carbon monoxide gas and hydrogen gas) as a raw material (illustration is omitted.). The FT synthesis reactor receives feed of the synthesis gas from a reforming reactor that reforms natural gas to produce a synthesis gas (illustration is omitted.).

The apparatus for producing a hydrocarbon oil 100 mainly includes a first fractionator 20 that fractionates the FT synthetic oil to a raw naphtha fraction, a raw middle distillate, and a raw wax fraction; a naphtha fraction hydrotreating reactor 30 that hydrotreats the raw naphtha fraction fed from the top of the first fractionator 20 by Line 2; an middle distillate hydrotreating reactor 32 that hydrotreats and hydro-isomerizes the raw middle distillate from the middle of the first fractionator 20 by Line 3; a wax fraction hydrocracking reactor 34 that hydrocracks the raw wax fraction fed from the bottom of the first fractionator 20 by Line 4; and a second fractionator 60 that fractionates the hydrotreated product of the middle distillate and the hydrocracked product of the wax fraction.

Here, the naphtha fraction is a hydrocarbon fraction having a boiling point approximately not lower than 25° C. and approximately lower than 150° C. (approximately $C_5$ to $C_{10}$); the middle distillate is a hydrocarbon fraction whose boiling point is approximately 150 to 360° C. (approximately $C_{11}$ to $C_{21}$); the wax fraction is a hydrocarbon fraction whose boiling point is approximately higher than 360° C. (approximately $C_{22}$ or more). Moreover, each of the raw naphtha fraction, the raw middle distillate, and the raw wax fraction is not subjected to hydrotreating or hydrocracking, and means the fraction containing olefins and the oxygen-containing compound such as alcohols, which are impurities (byproducts in the FT synthesis reaction), other than saturated aliphatic hydrocarbons (paraffins).

The wax fraction hydrocracking reactor 34 is an apparatus in which the process for producing a hydrocarbon oil according to the present embodiment is implemented; the regenerated hydrocracking catalyst according to the present embodiment is preferably packed into the wax fraction hydrocracking reactor 34 as a fixed bed. The raw wax fraction fed by Line 4 is mixed with an uncracked wax recycled by Line 13 connected to Line 4 (the detail will be described later) and hydrogen gas fed by a hydrogen gas feed line connected to Line 4 (illustration is omitted.), heated to a reaction temperature by a heating device provided on Line 4 such as a heat exchanger (illustration is omitted.), and fed to the wax fraction hydrocracking reactor 34 to be hydrocracked.

The middle distillate hydrotreating reactor 32 is preferably packed with a hydrotreating catalyst as a fixed bed. The raw middle distillate fed by Line 3 is mixed with hydrogen gas by a hydrogen gas feed line connected to Line 3 (illustration is omitted.), heated to the reaction temperature by a heating device provided on Line 3 such as a heat exchanger (illustration is omitted.), and fed to the middle distillate hydrotreating reactor 32 to be subjected to hydrotreating and hydro-isomerization.

The naphtha fraction hydrotreating reactor 30 is preferably packed with a hydrotreating catalyst as a fixed bed. The raw naphtha fraction fed by Line 2 is mixed with hydrogen gas by hydrogen gas feed line connected to Line 2 (illustration is omitted.), heated to the reaction temperature by a heating device provided on Line 2 such as a heat exchanger (illustration is omitted.), and fed to the naphtha fraction hydrotreating reactor 30 to be hydrotreated.

The apparatus for producing a hydrocarbon oil 100 includes a gas liquid separator 40 downstream of the naphtha fraction hydrotreating reactor 30, a gas liquid separator 42 downstream of the middle distillate hydrotreating reactor 32, and a gas liquid separator 44 downstream of the wax fraction hydrocracking reactor 34, and gas-liquid separates a liquid hydrocarbon, which is a hydrotreated product or hydrocracked product discharged from each of the reactors, from a gaseous component containing an unreacted hydrogen gas and gaseous hydrocarbon. Moreover, each of the gas liquid separators includes an apparatus for discharging water by-produced at the time of hydrotreating or hydrocracking (illustration is omitted.).

Moreover, the apparatus for producing a hydrocarbon oil 100 includes a naphtha stabilizer 50 downstream of the gas liquid separator 40, the naphtha stabilizer 50 discharging a gaseous hydrocarbon containing hydrocarbons having carbon number of 4 or less as a main component in the hydrotreated naphtha fraction fed via Line 5 from Line 8 connected to the top of the naphtha stabilizer 50. Moreover, the naphtha fraction from which the gaseous hydrocarbon is removed is fed via Line 9 from the bottom of the naphtha stabilizer 50; the apparatus for producing a hydrocarbon oil 100 includes a naphtha tank 70 for storing the naphtha fraction.

Further, the apparatus for producing a hydrocarbon oil 100 includes a second fractionator 60 downstream of the gas liquid separator 42 and the gas liquid separator 44; the second fractionator 60 fractionates a mixture of a hydrotreated middle distillate fed from the gas liquid separator 42 via Line 6 and a hydrocracked product of the wax fraction fed from the gas liquid separator 44 via Line 7. In the second fractionator 60, Line 11 connected to the middle of the second fractionator 60 and for discharging a fractionated kerosene fraction and transferring the kerosene fraction to a kerosene tank 72, and Line 12 connected to a lower portion of the second fractionator 60 and for discharging a fractionated gas oil fraction and transferring the gas oil fraction to a gas oil tank 74 are provided. Moreover, Line 13 for discharging a bottom oil of the second fractionator 60 and recycling the bottom oil to Line 4 upstream of the wax fraction hydrocracking reactor 34 is connected to the bottom of the second fractionator 60, the bottom oil containing an uncracked wax not sufficiently cracked in the wax fraction hydrocracking reactor 34 as a main component. Further, Line 10 for discharging a light hydrocarbon containing the naphtha fraction as a main component and feeding the light hydrocarbon to the naphtha stabilizer 50 is connected to the top of the second fractionator 60.

Next, with reference to FIG. 1, one embodiment of the process for producing a hydrocarbon oil according to the present invention will be described.

The regenerated hydrocracking catalyst according to the present embodiment is packed into the wax fraction hydrocracking reactor 34. Before the raw material oil is fed to the wax fraction hydrocracking reactor 34, the regenerated hydrocracking catalyst is activated by reduction. The reduction is usually performed by contacting the regenerated hydrocracking catalyst with molecular hydrogen (hydrogen gas) under heating. Specifically, the reduction is performed in a hydrogen stream at a temperature of approximately 250 to 550° C. for approximately 0.5 to 20 hours, for example.

The FT synthetic oil from the FT synthesis reactor (illustration is omitted.) via Line 1 is fractionated into the raw naphtha fraction, the raw middle distillate, and the raw wax fraction in the first fractionator 20. The raw wax fraction discharged from the bottom of the first fractionator 20 via Line 4, whose boiling point is higher than approximately 360° C. (approximately $C_{22}$ or more), is a solid fraction at normal temperature. An uncracked wax (the details will be described later) recycled by Line 13 connected to Line 4 and hydrogen gas are mixed with the raw wax fraction, and the mixture is heated to the reaction temperature, fed to the wax fraction hydrocracking reactor 34, and hydrocracked.

The mixture of the raw wax fraction and the uncracked wax (hereinafter, referred to as a "wax for processing" in some cases.) is hydrocracked in the wax fraction hydrocracking reactor 34, and converted to a component equivalent to the middle distillate. At this time, olefins by-produced in the FT synthesis reaction and contained in the raw wax fraction are hydrogenated and converted to paraffin hydrocarbons, and the oxygen-containing compound such as alcohols is hydrodeoxidized and converted to paraffin hydrocarbons and water or the like. Moreover, at the same time, production of isoparaffin by hydro-isomerization of normal paraffin proceeds, which contributes to fluidity at a low temperature as the base stock for fuel oil. Moreover, part of the wax for processing is excessively hydrocracked, and converted to the hydrocarbons equivalent to the naphtha fraction whose boiling point is lower than that of the hydrocarbons equivalent to the target middle distillate. Moreover, part of the wax for processing is further hydrocracked, and converted to gaseous hydrocarbons having carbon number of 4 or less such as butanes, propane, ethane, and methane. On the other hand, part of the wax for processing is not sufficiently hydrocracked, and is discharged from the wax fraction hydrocracking reactor 34 as the uncracked wax.

In the hydrocracking of the wax for processing in the wax fraction hydrocracking reactor 34, it is desirable that the "cracking rate" defined by formula (1) be 50 to 90%, and preferably 60 to 80%:

cracking rate (%)=[(mass of hydrocarbon whose boiling point is higher than 360° C. in mass of wax for processing units)−(mass of hydrocarbons whose boiling point is higher than 360° C. in mass of hydrocracked product units)]×100/(mass of hydrocarbon whose boiling point is higher than 360° C. in mass of wax for processing units)  (1)

At a cracking rate of less than 50%, the hydrocracking of the wax for processing is insufficient, and the yield of the middle distillate is reduced. On the other hand, at a cracking rate more than 90%, the hydrocracking of the wax for processing excessively proceeds, production of the light hydrocarbons whose boiling point is lower than that of the middle distillate is increased, and the yield of the middle distillate is decreased because the ratio of the middle distillate in the cracked product is decreased.

A method of controlling a cracking rate by the reaction temperature in the wax fraction hydrocracking reactor 34 is common. Usually, with a lapse of the operating time of the wax fraction hydrocracking reactor 34, the activity of the regenerated hydrocracking catalyst packed into the reactor is decreased. Then, the reactor is usually operated by adjusting the reaction temperature so as to keep the cracking rate constant. Namely, in order to compensate for the decrease in the activity of the regenerated hydrocracking catalyst with a lapse of the operating time, an operation to increase the reaction temperature by a width corresponding to the decrease in the activity is performed.

In this application, the "uncracked wax" refers to a wax not being hydrotreated to 360° C. of the boiling point. The uncracked wax is separated as a bottom oil in the second fractionator 60 described later, and recycled to the wax fraction hydrocracking reactor 34. Moreover, the "hydrocracked product" means all the products discharged from the wax fraction hydrocracking reactor 34 including the uncracked wax, unless otherwise specified.

The reaction temperature in the wax fraction hydrocracking reactor 34 (weight average catalyst bed temperature) is properly selected according to the cracking rate to be set and the decrease in the activity of the hydrocracking catalyst with lapse of the operation time; examples of the reaction temperature can include 180 to 400° C.; preferably 200 to 370° C., more preferably 250 to 350° C., and still more preferably 280 to 350° C. At a reaction temperature higher than 400° C., the hydrocracking excessively proceeds to increase the production of the light fraction, and the yield of the target middle distillate is likely to be decreased. Moreover, the hydrocracked product may be colored, and use thereof as a base stock for fuel may be limited. On the other hand, at a reaction temperature lower than 180° C., the hydrocracking of the wax fraction does not sufficiently proceed, and the yield of the middle distillate is likely to be decreased. Moreover, the olefins and oxygen-containing compound such as alcohols in the wax fraction are likely not to be sufficiently removed.

The hydrogen partial pressure in the wax fraction hydrocracking reactor 34 is, for example, 0.5 to 12 MPa, and 1.0 to 5.0 MPa is preferred.

The liquid hourly space velocity (LHSV) in the wax fraction hydrocracking reactor 34 is, for example, 0.1 to 10.0 h$^{-1}$, and 0.3 to 3.5 h$^{-1}$ is preferred. The ratio of hydrogen gas to the wax fraction (hydrogen gas/oil ratio) is not particularly limited, and is 50 to 1000 NL/L, for example, and 70 to 800 NL/L is preferred. Here, the "NL" means a volume of hydrogen (L) in a normal state (0° C., 101325 Pa). At a ratio of hydrogen gas/oil lower than 50 NL/L, the hydrocracking is likely not to sufficiently proceed; on the other hand, at a ratio of hydrogen gas/oil higher than 1000 NL/L, an excessively large hydrogen gas feeding source is likely to be needed.

The hydrocracked product discharged from the wax fraction hydrocracking reactor 34 is gas-liquid separated in the gas liquid separator 44. Namely, the unreacted hydrogen gas and a gaseous component mainly comprising C4 or less hydrocarbon gas are separated from a liquid component that is a hydrocarbon oil having carbon number distribution equivalent to the naphtha fraction to the uncracked wax. The separated gaseous component is reused in the hydroprocessing reaction. The liquid component is mixed with the hydrotreated product of the middle distillate fed from the middle distillate hydrotreating reactor 32 via the gas liquid separator 42, and the mixture is fed to the second fractionator 60.

While the gas liquid separator 44 is shown as a single vessel in FIG. 1, it is preferable that the gas liquid separator 44 be a multi-stage gas-liquid separator including a plurality of coolers and separating vessels. The gas-liquid separation is performed by such a separator; thereby, the uncracked wax contained in the hydrocracked product can be quickly cooled and solidified, and prevent problems such as clogging of the separator or the like.

In the second fractionator 60, the liquid hydrocarbon discharged from the wax fraction hydrocracking reactor 34 is fractionated with the hydrotreated product of the middle distillate fed from the middle distillate hydrotreating reactor 32, and the bottom oil containing the uncracked wax as the main component is discharged from the bottom of the second fractionator 60. The bottom oil is recycled by Line 13 to Line 4, the uncracked wax is mixed with the raw wax fraction and fed to the wax fraction hydrocracking reactor 34 again to be fed to the hydrocracking. Thus, the operation to hydrocrack the uncracked wax again is performed while the cracking rate is kept at a predetermined level; thereby, increase in the light fraction to be produced by the excessive hydrocracking of the wax for processing can be suppressed, and the yield of the middle distillate can be improved.

In the wax fraction hydrocracking reactor 34, in order to increase the yield of the middle distillate, the hydrocracking is performed at a predetermined cracking rate, as described above. On the other hand, if the wax for processing is hydrocracked at the cracking rate above, part of the wax for processing is inevitably subjected to the excessive hydrocracking, and converted to the light fraction (naphtha fraction or $C_4$ or less gaseous hydrocarbon) whose boiling point is lower than that of the middle distillate (approximately 150 to 360° C.). Accordingly, if the predetermined cracking rate can be kept and the excessive hydrocracking can be suppressed, the yield of the middle distillate is improved. Namely, a regenerated hydrocracking catalyst is desired in which the activity for the hydrocracking is high, and the activity for the excessive hydrocracking is suppressed.

The conventional regenerated hydrocracking catalyst comprising zeolite and an amorphous complex metal oxide having solid acidity as the catalyst support, and at least one active metal supported on the catalyst support and selected from noble metals of Group 8 to Group 10 in the periodic table is a catalyst having such properties. However, usually, the activity of the regenerated hydrocracking catalyst is likely to be decreased with a lapse of the operating time of the wax fraction hydrocracking reactor. Particularly, in the case where the regenerated catalyst is packed and the operation of the apparatus is started, decrease in the activity of the regenerated hydrocracking catalyst proceeds remarkably at the initial stage of the operation from the start to 500 hours after the start of the operation; at a period of time when the initial stage of the operation has passed (stable phase), the activity of the catalyst is likely to be relatively stable, and show mild decrease. Accordingly, as the hydrocracking catalyst, a catalyst is desired in which at the stable phase, the activity for the hydrocracking is kept at a relatively high level, and the activity for the excessive hydrocracking is suppressed; however, the conventional regenerated hydrocracking catalyst does not always satisfy the required performance, decrease in the hydrocracking activity is larger, and the selectivity of the middle distillate described later is decreased.

On the other hand, the regenerated hydrocracking catalyst according to the present embodiment has the specific configuration above; thereby, has a relatively high cracking activity and suppressed activity for the excessive hydrocracking at the stable phase of the catalyst. For this reason, the regenerated hydrocracking catalyst according to the present embodiment can provide the predetermined cracking rate at a relatively low reaction temperature and a relatively high selectivity of the middle distillate at the stable phase of the catalyst, and the middle distillate can be obtained at a high yield.

Here, the selectivity of the middle distillate is defined by formula (2):

$$\text{selectivity of the middle distillate (\%)} = [(\text{mass of hydrocarbon whose boiling point is 150 to 360}° \text{ C. in mass of hydrocracked product units}) - (\text{mass of hydrocarbon whose boiling point is 150 to 360}° \text{ C. in mass of wax for processing units})] \times 100 / [(\text{mass of hydrocarbon whose boiling point is higher than 360}° \text{ C. in mass of wax for processing units}) - (\text{mass of hydrocarbon whose boiling point is higher than 360}° \text{ C. in mass of hydrocracked product units})] \quad (2)$$

Although the mechanism of effect under which such features possessed by the regenerated hydrocracking catalyst of the present embodiment are exerted is not clarified, the present inventors presume as follows. Namely, the hydrocracking catalyst has two functions, that is, a hydrogenation activity by the active metal and solid acidity possessed by the catalyst support. With regard to active sites (acid sites) exhibiting solid acidity on the catalyst support, properties (acidity, for example) as a solid acid are not uniform and have a distribution. It can be considered that an acid site mainly catalyzing moderate hydrocracking that gives the desired middle distillate and an acid site mainly catalyzing undesirable excessive hydrocracking are included in these acid sites. On the other hand, the carbonaceous substance contained in the catalyst is considered to inhibit the catalytic action possessed by the acid sites on the catalyst support. In the regenerated hydrocracking catalyst of the present embodiment, 0.05 to 1% by mass of the carbonaceous substance in terms of the carbon atom is contained, and this carbonaceous substance is presumed to thereby exert the inhibitory effect more selectively on the above-described acid site catalyzing excessive hydrocracking compared with the acid site catalyzing moderate hydrocracking when exerting the inhibitory effect on the acid sites on the catalyst support. As a result, it is considered that the activity for excessive hydrocracking is suppressed in a manner relative to the activity for moderate hydrocracking to give a relatively higher middle distillate selectivity than that of the conventional catalyst at the predetermined cracking rate. As a result, the regenerated hydrocracking catalyst of the present embodiment can presumably obtain a high yield of the middle distillate compared with the conventional regenerated hydrocracking catalyst. In addition, the reason why a high middle distillate selectivity can be maintained even in the stable phase of the catalyst is presumed as follows. Namely, a regenerated hydrocracking catalyst containing a carbonaceous substance in an amount less than 0.05% by mass easily produces a new carbonaceous substance in the early stage of the operation. This newly produced carbonaceous substance inhibits even the acid site catalyzing moderate hydrocracking, and therefore, the middle distillate selectivity also reduces as the hydrocracking activity reduces. On the other hand, the regenerated hydrocracking catalyst of the present embodiment newly produces a few carbonaceous substances in the early stage of the operation, and therefore, it is considered that reduction in hydrocracking activity and reduction in middle distillate selectivity are small in the early stage of the operation and this is also maintained in the stable phase.

The raw middle distillate to be discharged from the middle of the first fractionator 20 by Line 3 is a fraction comprising a mixture of hydrocarbons whose boiling point is approximately 150 to 360° C. (approximately $C_{11}$ to $C_{21}$), and contains linear saturated aliphatic hydrocarbons having the boiling point in the range as the main component and olefins and the oxygen-containing compound such as alcohols as impurities, which are by-products of the FT synthesis reaction.

The raw middle distillate is mixed with hydrogen gas, heated to the reaction temperature, and fed to the middle distillate hydrotreating reactor 32. The reactor is packed with a hydrotreating catalyst; the mixture of the raw middle distillate and hydrogen gas is contacted with the catalyst to proceed hydrotreating and hydro-isomerization of the raw middle distillate.

The hydrotreating of the raw middle distillate is a reaction in which impurities (olefins and the oxygen-containing compound such as alcohols) contained in the raw middle distillate are removed. The olefins (unsaturated aliphatic hydrocarbons) are hydrogenated and converted to saturated aliphatic hydrocarbons (paraffins). Moreover, the oxygen-containing compound such as alcohols is hydro-deoxidized and converted to saturated aliphatic hydrocarbons and water or the like. By the hydrotreating, the impurities that may be contained in a fuel oil to affect the structure material of the engine can be removed.

Hydro-isomerization converts straight-chain saturated aliphatic hydrocarbons (normal paraffins) to branched-chain saturated hydrocarbons (isoparaffins) by skeletal isomerization. By the hydrogenation isomerization, the content of the normal paraffins in the middle distillate is reduced, and the content of the isoparaffins are increased; thereby, crystallinity of the paraffins is decreased to improve the fluidity at a low temperature as the fuel oil.

As the hydrotreating catalyst to be packed into the middle distillate hydrotreating reactor 32, a known hydrotreating catalyst can be used. Examples of the known hydrotreating catalyst include catalysts comprising a catalyst support containing an amorphous complex metal oxide having solid acidity, and at least one active metal supported on the catalyst support and selected from noble metals of Group 8 to Group 10 in the periodic table.

The amorphous complex metal oxide having solid acidity that constitutes the catalyst support is an complex metal oxide comprising a combination of two or three or more selected from metal oxide units such as alumina, silica, titania, zirconia, boria, and magnesia, and specific examples thereof include silica alumina, silica zirconia, alumina boria, alumina zirconia, silica titania, and silica magnesia. Among these, silica alumina, silica zirconia, and alumina boria are preferable, and silica zirconia is more preferable.

The catalyst support may also contain a small amount of zeolite. In this case, examples of a preferred zeolite include an ultra stable Y (USY) zeolite, Y zeolite, mordenite, and beta zeolite. The ratio of the mass of the catalyst support to that of zeolite in this case is not particularly limited, and is 0.5 to 10% by mass, and preferably 1 to 5% by mass.

Further, a binder may be compounded with the catalyst support in order to improve moldability and mechanical strength of the catalyst support. Examples of a preferred binder include alumina, silica, and magnesia. In the case where the binder is compounded with the catalyst support, the amount of the binder to be compounded is not particularly limited, and is 20 to 98% by mass, and preferably 30 to 96% by mass based on the entire mass of the catalyst support.

The catalyst support is preferably molded. The shape of the molded catalyst support is not particularly limited, and examples thereof include a sphere, a cylinder, an irregular cylinder having a trilobes or quadrolobes, and a disc. A method for molding a catalyst support is not limited, and a known method such as extrusion molding and compression molding is used. The molded catalyst support is usually calcined.

The noble metals of Group 8 to Group 10 in the periodic table as the active metal that constitutes the hydrotreating catalyst are ruthenium and osmium as the noble metals of Group 8, rhodium and iridium as the noble metals of Group 9, and palladium and platinum as the noble metals of Group 10. Among these, preferable noble metals are platinum and palladium, and more preferable is platinum. Moreover, a combination of platinum-palladium is preferably used.

It is preferable that the content of the active metal supported on the catalyst support be 0.1 to 3% by mass as a metal atom based on the mass of the catalyst support. If the content of the active metal is less than the lower limit value, the hydrotreating and hydro-isomerization are likely not to sufficiently proceed. On the other hand, if the content of the active metal is larger than the upper limit value, dispersion of the active metal is likely to be decreased to decrease the activity of the catalyst, and cost of the catalyst is increased.

As the hydrotreating catalyst to be packed into the middle distillate hydrotreating reactor 32, the regenerated hydrocracking catalyst according to the present embodiment may be used. The middle distillate having a smaller number of carbons than that in the wax fraction is relatively hard to hydrocrack; for this reason, if the regenerated hydrocracking catalyst according to the present embodiment is used, production of the light fraction by the hydrocracking is not remarkable.

The reaction temperature in the middle distillate hydrotreating reactor 32 is 180 to 400° C., preferably 200 to 370° C., more preferably 250 to 350° C., and particularly preferably 280 to 340° C. Here, the reaction temperature is a weight average temperature of the catalyst bed within the middle distillate hydrotreating reactor 32. At a reaction temperature higher than 400° C., cracking to the light fraction proceeds to reduce the yield of the middle distillate, but also the product is likely colored, limiting use as the base stock for fuel oil. On the other hand, at a reaction temperature lower than 180° C., the oxygen-containing compound such as alcohols is not sufficiently removed but remains; moreover, production of isoparaffins by the hydro-isomerization reaction is likely to be suppressed.

It is preferable that the pressure (hydrogen partial pressure) in the middle distillate hydrotreating reactor 32 be 0.5 to 12 MPa, and it is more preferable that the pressure be 1 to 5 MPa. At a pressure lower than 0.5 MPa, the hydrotreating and hydro-isomerization are likely not to sufficiently proceed; on the other hand, at a pressure higher than 12 MPa, high pressure resistance of the apparatus is demanded, and facility cost is likely to be increased.

It is preferable that the liquid hourly space velocity (LHSV) in the middle distillate hydrotreating reactor 32 be 0.1 to 10 $h^{-1}$, and it is more preferable that the LHSV be 0.3 to 3.5 $h^{-1}$. At an LHSV lower than 0.1 $h^{-1}$, the cracking to the light fraction proceeds to reduce the yield of the middle distillate, and productivity is likely to be decreased; on the other hand, at an LHSV higher than 10.0 $h^{-1}$, hydrotreating and hydro-isomerization are likely not to sufficiently proceed.

It is preferable that the ratio of hydrogen gas/oil in the middle distillate hydrotreating reactor 32 be 50 to 1000 NL/L, and it is more preferable that the ratio of hydrogen gas/oil be 70 to 800 NL/L. Here, the "NL" means a volume of hydrogen (L) in a normal state (0° C., 101325 Pa). At a ratio of hydrogen gas/oil lower than 50 NL/L, the hydrotreating and hydro-isomerization are likely not to sufficiently proceed; on the other hand, at a ratio of hydrogen gas/oil higher than 1000 NL/L, a large-scale hydrogen gas feeding source is likely to be needed.

The product discharged from the middle distillate hydrotreating reactor 32 is introduced into the gas liquid separator 42, and separated into a liquid product (liquid hydrocarbon) and an unreacted hydrogen gas and a gaseous component containing gaseous hydrocarbon as the main component. The liquid hydrocarbon (hydrotreated middle distillate) is introduced into the second fractionator 60 downstream of the middle distillate hydrotreating reactor 32, and the gaseous component is reused in the hydroprocessing reaction.

The raw naphtha fraction to be discharged from the top of the first fractionator 20 via Line 2 is a fraction comprising liquid hydrocarbons whose boiling point is lower than approximately 150° C. (approximately $C_5$ to $C_{10}$), and contains linear saturated aliphatic hydrocarbons having the boiling point in the above range as the main component, and olefins and the oxygen-containing compound such as alcohols as impurities, which are by-products of the FT synthesis reaction. The raw naphtha fraction is mixed with hydrogen gas, heated to the reaction temperature, fed to the naphtha fraction hydrotreating reactor 30, and hydrotreated.

As the hydrotreating catalyst to be packed into the naphtha fraction hydrotreating reactor 30, a known hydrotreating catalyst can be used; for example, the same catalyst as the hydrotreating catalyst packed into the middle distillate hydrotreating reactor 32 may be used. In the naphtha fraction hydrotreating reactor 30, olefins contained in the raw naphtha fraction are converted to saturated hydrocarbons by hydrogenation, and the oxygen-containing compound such as alcohols is converted to hydrocarbons and water or the like by hydro-deoxidation. The raw naphtha fraction is hydrocarbons having carbon number of approximately 10 or less, and as the properties, hydro-isomerization and hydrocracking hardly occur.

The olefins and oxygen-containing compound such as alcohols are contained in the raw naphtha fraction in a relatively high concentration, and high reaction heat is generated in the hydrotreating reaction that converts these to saturated hydrocarbons. Accordingly, if only the raw naphtha fraction is fed to the hydrotreating, the temperature of the naphtha fraction may be excessively raised within the naphtha fraction hydrotreating reactor 30. Accordingly, it is preferable that a part of the hydrotreated naphtha fraction to be discharged from the naphtha fraction hydrotreating reactor 30 be recycled to the naphtha fraction hydrotreating reactor 30 by Line 14 to Line 2 upstream of Line 14; thereby, the raw naphtha fraction be diluted by the treated naphtha fraction, and fed to the hydrotreating.

The reaction temperature in the naphtha fraction hydrotreating reactor 30 is 180 to 400° C., preferably 280 to 350° C., and more preferably 300 to 340° C. Here, the reaction temperature is the average temperature of the catalyst bed in the naphtha fraction hydrotreating reactor 30. If the reaction temperature is not lower than the lower limit temperature, the raw naphtha fraction is sufficiently hydrotreated; if the reaction temperature is not higher than the upper limit temperature, reduction in the life of the catalyst is suppressed.

It is preferable that the pressure (hydrogen partial pressure) in the naphtha fraction hydrotreating reactor 30 be 0.5 to 12 MPa, and it is more preferable that the pressure be 1 to 5 MPa. At a pressure not lower than 0.5 MPa, the raw naphtha fraction is sufficiently hydrotreated; at a pressure not higher than 12 MPa, facility cost for increasing pressure resistance of the faculty can be suppressed.

It is preferable that the liquid hourly space velocity (LHSV) in the naphtha fraction hydrotreating reactor 30 be 0.1 to 10 h$^{-1}$, and it is more preferable that the LHSV be 0.3 to 3.5 h$^{-1}$. At an LHSV not lower than 0.1 h$^{-1}$, the volume of the reactor does not need to be excessive; at an LHSV not higher than 10 h$^{-1}$, the raw naphtha fraction is efficiently hydrotreated.

It is preferable that the ratio of hydrogen gas/oil in the naphtha fraction hydrotreating reactor 30 be 50 to 1000 NL/L, and it is more preferable that the ratio of hydrogen gas/oil be 70 to 800 NL/L. Here, the "NL" means a volume of hydrogen (L) in a normal state (0° C., 101325 Pa). At a ratio of hydrogen gas/oil not lower than 50 NL/L, the raw naphtha fraction is sufficiently hydrotreated; at a ratio of hydrogen gas/oil not higher than 1000 NL/L, the facility for feeding a large amount of hydrogen gas is unnecessary, and increase in operation cost can be suppressed.

The produced oil discharged from the naphtha fraction hydrotreating reactor 30 is gas-liquid separated into a gaseous component containing the unreacted hydrogen gas as the main component and a liquid hydrocarbon in the gas liquid separator 40. The gaseous component is reused in the hydroprocessing reaction, and the liquid hydrocarbon is fed via Line 5 to the naphtha stabilizer 50; C$_4$ or less gaseous hydrocarbons are removed from Line 8, and the naphtha fraction mainly comprising C$_5$ to C$_{10}$ is passed through Line 9 and stored in the naphtha tank 70.

In the second fractionator 60, a plurality of cut points are provided according to the hydrocarbon oil to be discharged, and fractionation of a mixed oil of the hydrotreated product of the middle distillate fed from the middle distillate hydrotreating reactor 32 and the hydrocracked product of the wax fraction fed from the wax fraction hydrocracking reactor 34 is performed.

In the present embodiment, the cut points are set at 150° C., 250° C., and 360° C. The light fraction containing the naphtha fraction is discharged from the top of the second fractionator 60 via Line 10, fed to the naphtha stabilizer 50 to remove C4 or less hydrocarbon gas, and stored as product naphtha in the naphtha tank 70. The kerosene fraction is discharged from the middle of the second fractionator 60 via Line 11, and stored in the kerosene tank 72. The gas oil fraction is discharged from the lower portion of the second fractionator 60 via Line 12, and stored in the gas oil tank 74. The bottom oil containing the uncracked wax as the main component is discharged from the bottom of the second fractionator 60 via Line 13, recycled to Line 4, and fed with the raw wax fraction to the wax fraction hydrocracking reactor 34 to be hydrocracked again.

Thus, the gas oil fraction, the kerosene fraction, and the naphtha fraction are obtained.

The process for producing a hydrocarbon oil according to the present invention will not be limited to the example of the embodiment above, and various modifications and additions can be made without departing the gist of the present invention.

For example, in the embodiment above, the FT synthetic oil fed from the FT synthesis reactor is fractionated to the raw naphtha fraction, the raw middle distillate, and the raw wax fraction in the first fractionator 20; alternatively, in the fractionation, the raw naphtha fraction and the raw middle distillate may be fractionated as one fraction of a raw naphtha and middle distillate. Moreover, the raw naphtha and middle distillate may be fed to the hydrotreating in a single hydrotreating reactor.

Further, without fractionating the FT synthetic oil in the first fractionator 20, the FT synthetic oil may be gas-liquid separated at the temperature in the FT synthesis reactor to separate a light liquid hydrocarbon obtained by cooling and liquefying a light hydrocarbon that is gaseous at the temperature and a heavy liquid hydrocarbon that is liquid at the temperature. Moreover, without providing the naphtha fraction hydrotreating reactor 30, the light liquid hydrocarbon may be fed to the hydrotreating in the middle distillate hydrotreating reactor 32, and the heavy liquid hydrocarbon may be fed to the hydrocracking in the wax fraction hydrocracking reactor 34.

Moreover, in the embodiment above, the mixture of the hydrotreated middle distillate discharged from the middle distillate hydrotreating reactor 32 and the hydrocracked product of the wax fraction discharged from the wax fraction hydrocracking reactor 34 is fractionated in the second fractionator 60, but the present invention will not be limited to this; for example, the hydrotreated middle distillate discharged from the middle distillate hydrotreating reactor 32 and the hydrocracked product of the wax fraction discharged from the wax fraction hydrocracking reactor 34 may be fractionated in separate fractionators.

Further, in the embodiment above, the naphtha fraction, the kerosene fraction, and the gas oil fraction are obtained as products; alternatively, the kerosene fraction and the gas oil fraction may be recovered as one fraction (middle distillate).

EXAMPLES

Hereinafter, according to Examples, the present invention will be more specifically described, but the present invention will not be limited to Examples below.

Reference Example

Preparation of New Hydrocracking Catalyst

Water was added to a composition containing 30% by mass of a gel of silica alumina as a dry mass, 60% by mass of powder alumina (binder), and 10% by mass of powder USY zeolite (average particle size of 0.4 μm, molar ratio of silica/alumina (molar ratio of silica to alumina) of 32), and kneaded into a clay-like product to prepare a kneaded product. The kneaded product was molded into a cylindrical shape having a diameter of approximately 1.5 mm and a length of approximately 3 mm by extrusion molding. The obtained mold was dried at 120° C. for 3 hours, and further calcined in the air at 450° C. for 3 hours to obtain a catalyst support.

The catalyst support was impregnated into an aqueous solution of 0.8% by mass of dichlorotetraammine platinum (II) as a platinum atom based on the mass of the catalyst support using the incipient wetness method, and further dried at 120° C. for 3 hours to obtain a catalyst precursor.

Next, the catalyst precursor was calcined. The catalyst precursor was placed in a heating furnace, and the temperature was raised under an air atmosphere to 300° C.; then, the temperature was raised from 300 to 400° C. at a heating rate of 10° C./h; then, calcination was performed at 500° C. for 1 hour to obtain a hydrocracking catalyst.

<Production of Hydrocarbon Oil by New Hydrocracking Catalyst>

The thus-obtained hydrocracking catalyst was packed into a fixed bed flow reactor, and the reduction was performed under a hydrogen stream at 340° C. for 4 hours to activate the catalyst.

Next, the FT synthetic oil obtained by the FT synthesis reaction was fractionated by the fractionator to obtain a bottom oil (raw wax fraction) of the fractionator whose boiling point was higher than 360° C. The carbon distribution was examined by distillation gas chromatography, and the carbon distribution was in the range of $C_{22}$ to $C_{82}$. Using the raw wax fraction as the raw material oil, hydrocracking was performed.

The raw material oil was fed with hydrogen gas to a fixed bed flow reactor packed with the hydrocracking catalyst to hydrocrack. The hydrocracked product to be discharged from the reactor was cooled, and separated into unreacted hydrogen gas and mainly $C_4$ or less gaseous hydrocarbons by the gas liquid separator; the liquid hydrocarbon was fed to the fractionator to fractionate by setting the cut points at 150° C. and 360° C.; thereby, a middle distillate whose boiling point was in the range of 150 to 360° C. and a naphtha fraction whose boiling point was lower than 150° C. were recovered. Moreover, all the bottom oil of the fractionator was recycled to the line for feeding the raw material oil to the reactor. As the reaction condition, the reaction pressure (pressure of hydrogen gas) was 3.0 MPa, the LHSV was 2.0 $h^{-1}$, and the ratio of hydrogen/oil was 340 NL/L. The hydrocracked product to be discharged from the reactor (before fractionation) was analyzed by gas chromatograph, and the cracking rate defined by the formula (1) and the selectivity of the middle distillate defined by the formula (2) were calculated. Moreover, the reaction temperature was controlled such that the cracking rate was 70%. Because the activity of the hydrocracking catalyst was decreased with a lapse of the operating time, the reaction temperature was controlled such that the cracking rate was kept at 70% in each operating time, and the operation was continued. Then, when 13000 hours had passed from the start of the operation, the operation was stopped, and the inside of the reactor was washed by the middle distillate obtained by the hydrocracking to remove the wax fraction within the reactor. Further, the inside of the reactor was purged with nitrogen gas, the reactor was cooled to room temperature, and opened to take out the packed used catalyst.

Example 1

Preparation of Regenerated Hydrocracking Catalyst

Carbon Measuring Step

A sample was partially collected from the used catalyst obtained in Reference Example, sufficiently washed with hexane, and dried by a decreased pressure dryer at 70° C. for 2 hours. The carbonaceous substance contained in the sample was determined by a carbon and sulfur analyzer EMIA-920V made by HORIBA, Ltd. As a result, the used catalyst contained 6.9% by mass of the carbonaceous substance as a carbon atom based on the entire dry mass. Moreover, from change in the mass of the sample before and after washing with hexane and drying, the content of hydrocarbons of the used catalyst was calculated to be 10% by mass based on the entire dry mass of the catalyst.

(Deoiling Step)

The used catalyst was subjected to deoiling treatment in a nitrogen stream at 400° C. for 3 hours, (Calcination Step)

The deoiled used catalyst was placed in the heating furnace, and the temperature was raised to 300° C.; then, the temperature was raised from 300 to 400° C. at a heating rate of 10° C./h; then, calcination was performed at 520° C. for 1.5 hours to obtain a regenerated hydrocracking catalyst. The carbonaceous substance in the obtained regenerated hydrocracking catalyst was analyzed by the carbon and sulfur analyzer; as a result, the content of the carbonaceous substance was 0.05% by mass in terms of carbon atoms based on the entire mass of the catalyst.

<Production of Hydrocarbon Oil by Regenerated Hydrocracking Catalyst>

The hydrocracking of the hydrocarbon raw material oil of the raw wax fraction derived from the FT synthetic oil was performed in the same manner as in "Production of hydrocarbon oil by new hydrotreating catalyst" in Reference Example except that the regenerated hydrocracking catalyst obtained as described above was packed into the reactor. The reaction temperature was set at a temperature at which the cracking rate was 70%. Moreover, because the activity of the catalyst was decreased with a lapse of the operating time, the reaction temperature was raised such that the cracking rate was kept at 70%. The reaction temperature at which the cracking rate was 70% at the point of time when 2000 hours had passed after the start of the operation (stable phase) was 326° C. Moreover, the selectivity of the middle distillate at this time was 74% by mass. The result is shown in Table 1. The yield of the middle distillate is calculated by multiplying the cracking rate (70%) by the selectivity of the middle distillate.

Example 2

Preparation of Regenerated Hydrocracking Catalyst

In the calcination step in "Preparation of regenerated hydrocracking catalyst," a regenerated hydrocracking catalyst was obtained in the same manner as in Example 1 except that the calcination condition after the temperature was raised was 500° C. and for 1 hour. The content of the carbonaceous substance in the regenerated hydrocracking catalyst was 0.5% by mass in terms of carbon atoms.

<Production of Hydrocarbon Oil>

The hydrocracking of the raw wax fraction derived from the FT synthetic oil was performed in the same manner as in Example 1 except that the regenerated hydrocracking catalyst obtained as described above was used. The reaction temperature for keeping the cracking rate at 70% at a time when 2000 hours of the operating time had passed was 325° C., and the selectivity of the middle distillate at this time was 76% by mass. The result is shown in Table 1.

Figure 2:
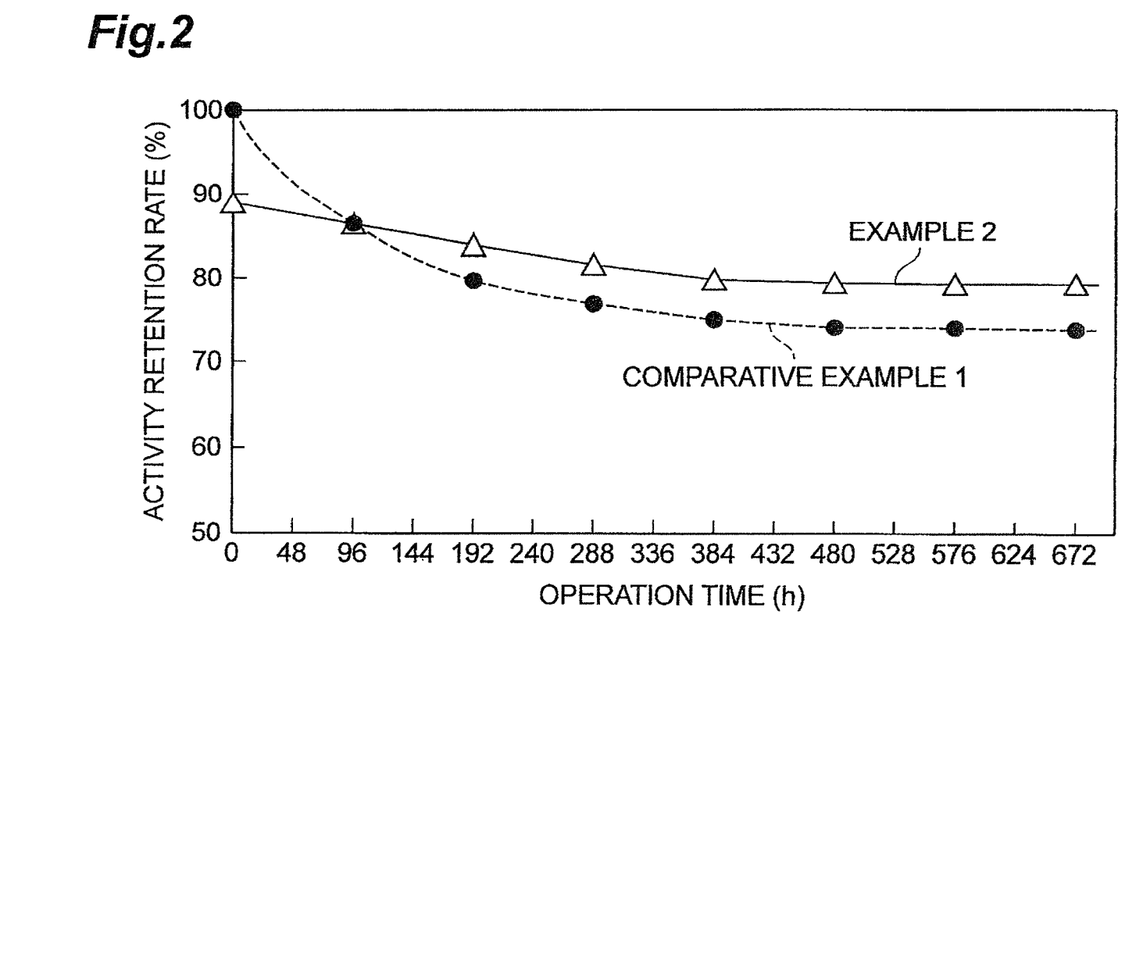
FIG. 2 is a graph showing change over time of activity of a regenerated hydrocracking catalyst in hydrocracking of a wax fraction in Example 2 and Comparative Example 1.

Moreover, trend of the activity of the regenerated hydrocracking catalyst from the initial stage of the operation to the catalyst stable phase, i.e., from the start of the operation to a time when approximately 670 hours have passed is shown in FIG. 2. The "activity retention rate" shown by the ordinate in FIG. 2 is an indexed value wherein the activity of the regenerated hydrocracking catalyst at the time of the start of the operation in Comparative Example 1 described later is 100. The activity retention rate was calculated as follows: using the Arrhenius equation, a relative activity was calculated from the reaction temperature for keeping the cracking rate at 70% in each operating time, and compared with the relative activity of the regenerated hydrocracking catalyst at the time of the start of the operation in Comparative Example 1.

Example 3

Preparation of Regenerated Hydrocracking Catalyst>

In the calcination step in "Preparation of regenerated hydrocracking catalyst," a regenerated hydrocracking catalyst was obtained in the same manner as in Example 1 except that the calcination condition after the temperature was raised was 490° C. and for 1 hour. The content of the carbonaceous substance in the regenerated hydrocracking catalyst was 0.8% by mass in terms of carbon atoms.

<Production of Hydrocarbon Oil>

The hydrocracking of the raw wax fraction derived from the FT synthetic oil was performed in the same manner as in Example 1 except that the hydrocracking catalyst obtained as described above was used. The reaction temperature for keeping the cracking rate at 70% at a time when 2000 hours of the operating time had passed was 333° C., and the selectivity of the middle distillate at this time was 77% by mass. The result is shown in Table 1.

Example 4

Preparation of Regenerated Hydrocracking Catalyst

First Deoiling Step

The used catalyst obtained in Reference Example was subjected to deoiling treatment in a nitrogen stream at 400° C. for 3 hours.

(First Calcination Step)

The deoiled used catalyst was placed in the heating furnace, and the temperature was raised under an air atmosphere to 300° C.; then, the temperature was raised from 300 to 400° C. at a heating rate of 10° C./h, and the catalyst was calcined at 580° C. for 2 hours to obtain a pre-regenerated catalyst. The carbonaceous substance in the obtained pre-regenerated catalyst was determined; as a result, no carbon atom was detected (the content was 0.02% by mass or less in terms of carbon atoms).

(Impregnating Step)

The pre-regenerated catalyst was impregnated into the hydrocarbon oil of the middle distillate obtained in "Production of hydrocarbon oil by new hydrocracking catalyst" in Reference Example.

(Second Deoiling Step)

The pre-regenerated catalyst was taken out from the hydrocarbon oil of the middle distillate, and subjected to the deoiling treatment in a nitrogen stream at 400° C. for 3 hours.

(Second Calcination Step)

The temperature of the pre-regenerated catalyst through the second deoiling step was raised under an atmosphere on the same temperature raising condition as that in the first calcination step, and the pre-regenerated catalyst was calcined at 450° C. for 0.8 hours to obtain a regenerated hydrocracking catalyst. The content of the carbonaceous substance in the regenerated hydrocracking catalyst was 0.2% by mass in terms of carbon atoms.

<Production of Hydrocarbon Oil>

The hydrocracking of the raw wax fraction derived from the FT synthetic oil was performed in the same manner as in Example 1 except that the regenerated hydrocracking catalyst obtained as described above was used. The reaction temperature at which the cracking rate was 70% at the operating time of 2000 hours was 325° C., and the selectivity of the middle distillate at this time was 75% by mass. The result is shown in Table 2.

Comparative Example 1

Preparation of Regenerated Hydrocracking Catalyst

The catalyst obtained in the "First calcination step" of "Preparation of regenerated hydrotreating catalyst" in Example 4 (pre-regenerated catalyst) was used as the regenerated hydrocracking catalyst as it was. As described above, no carbonaceous substance was detected in the regenerated hydrocracking catalyst (the content was 0.02% by mass or less in terms of carbon atoms).

<Production of Hydrocarbon Oil>

The hydrocracking of the raw wax fraction derived from the FT synthetic oil was performed in the same manner as in Example 1 except that the regenerated hydrocracking catalyst obtained as described above was used. The reaction temperature for keeping the cracking rate at 70% at a time when 2000 hours of the operating time had passed was 331° C., and the selectivity of the middle distillate at this time was 68% by mass. The result is shown in Table 1.

Moreover, trend of the activity of the hydrocracking catalyst from the initial stage of the operation to the catalyst stable phase, i.e., from the start of the operation to the time when approximately 670 hours have passed is shown in FIG. 2. The "activity retention rate" shown by the ordinate is as described in Example 2.

Comparative Example 2

Preparation of Regenerated Hydrocracking Catalyst

A regenerated hydrocracking catalyst was obtained in the same manner as in Example 4 except that the calcination condition after the temperature was raised in "Second calcination step" of "Preparation of regenerated hydrotreating catalyst" in Example 4 was 430° C. and for 1 hour. The content of the carbonaceous substance in the regenerated hydrocracking catalyst was 1.2% by mass in terms of carbon atoms.

<Production of Hydrocarbon Oil>

The hydrocracking of the raw wax fraction derived from the FT synthetic oil was performed in the same manner as in Example 1 except that the regenerated hydrocracking catalyst obtained as described above was used. The reaction temperature for keeping the cracking rate at 70% at a time when 2000 hours of the operating time had passed was 340° C., and the selectivity of the middle distillate at this time was 73% by mass. The result is shown in Table 2.

TABLE 1

|  | Example 1 | Example 2 | Example 3 | Comparative Example 1 |
| --- | --- | --- | --- | --- |
| Calcination temperature of used catalyst (° C.) | 520 | 500 | 490 | 580 |
| Calcination time of used catalyst (h) | 1.5 | 1 | 1 | 2 |
| Content of carbonaceous substance (% by mass) | 0.05 | 0.5 | 0.8 | 0.02 or less |
| Reaction temperature at which cracking rate is 70% (° C.) | 326 | 325 | 333 | 331 |
| Selectivity of middle distillate (% by mass) | 74 | 76 | 77 | 68 |

TABLE 2

|  | Example 4 | Comparative Example 2 |
| --- | --- | --- |
| Second calcination temperature of catalyst (° C.) | 450 | 430 |

TABLE 2-continued

|  | Example 4 | Comparative Example 2 |
|---|---|---|
| Second calcination time of catalyst (h) | 0.8 | 1 |
| Content of carbonaceous substance (% by mass) | 0.2 | 1.2 |
| Reaction temperature at which cracking rate is 70% (° C.) | 325 | 340 |
| Selectivity of middle distillate (% by mass) | 75 | 73 |

From the results of Table 1 and Table 2, it turned out that according to the regenerated hydrocracking catalyst in Examples 1 to 4 in which the content of the carbonaceous substance is 0.05 to 1% by mass, a higher selectivity of the middle distillate is obtained at the same cracking rate, namely, a higher yield of the middle distillate is obtained than in the regenerated hydrotreating catalyst in Comparative Example 1 in which the content of the carbonaceous substance is less than 0.05% by mass. Moreover, in the regenerated hydrotreating catalyst in Comparative Example 2 in which the content of the carbonaceous substance is more than 1% by mass, a relatively high selectivity of the middle distillate is obtained at the same cracking rate, but the reaction temperature for obtaining the same cracking rate is undesirably higher, and there is a problem in the life of the catalyst.

Moreover, from the result in FIG. 2, in the regenerated hydrocracking catalyst in Comparative Example 1 in which the content of the carbonaceous substance is less than 0.05% by mass, the activity at the time of the start of the operation is relatively high, but decrease in the activity over time at the initial stage of the operation is large. On the other hand, in the regenerated hydrocracking catalyst in Example 2 containing 0.05 to 1% by mass of the carbonaceous substance, the activity at the time of the start of the operation is lower than that in the hydrocracking catalyst in Comparative Example 1 in which the content of the carbonaceous substance is less than 0.05% by mass, but decrease in the activity over time at the initial stage of the operation is smaller, and the activity at the stable phase of the catalyst is rather higher than that in the hydrocracking catalyst in Comparative Example 1.

INDUSTRIAL APPLICABILITY

According to the present invention, by a regenerated hydrocracking catalyst that is advantageous with respect to cost, the middle distillate can be obtained at a high yield from the hydrocarbon raw material oil containing the wax fraction for a long period of time.

REFERENCE SIGNS LIST

20 . . . First fractionator, 30 . . . Naphtha fraction hydrotreating reactor, 32 . . . Middle distillate hydrotreating reactor, 34 . . . Wax fraction hydrocracking reactor, 60 . . . Second fractionator, 100 . . . Apparatus for producing a hydrocarbon oil.

The invention claimed is:

1. A regenerated hydrocracking catalyst prepared by regenerating a used hydrocracking catalyst comprising: a catalyst support containing zeolite and an amorphous composite metal oxide having solid acidity; and at least one active metal supported by the catalyst support, selected from noble metals of Group 8 to Group 10 in the periodic table, wherein the regenerated hydrocracking catalyst contains 0.05 to less than 0.5% by mass of a carbonaceous substance in terms of carbon atoms based on the entire mass of the catalyst.

2. The regenerated hydrocracking catalyst according to claim 1, wherein the zeolite is an ultra-stable Y zeolite.

3. The regenerated hydrocracking catalyst according to claim 1, wherein the amorphous composite metal oxide is at least one selected from silica alumina, alumina boria, and silica zirconia.

4. The regenerated hydrocracking catalyst according to claim 1, wherein the active metal is platinum.

5. A process for producing a hydrocarbon oil, comprising contacting a raw material oil containing 70% by mass or more of a linear aliphatic hydrocarbon with a boiling point of higher than 360° C. with the hydrocracking catalyst according to claim 1 in the presence of molecular hydrogen.

6. The process for producing a hydrocarbon oil according to claim 5, wherein the raw material oil is a synthetic oil obtained by a Fischer-Tropsch synthesis reaction.

7. The regenerated hydrocracking catalyst according to claim 2, wherein the amorphous composite metal oxide is at least one selected from silica alumina, alumina boria, and silica zirconia.

8. The regenerated hydrocracking catalyst according to claim 2, wherein the active metal is platinum.

9. The regenerated hydrocracking catalyst according to claim 3, wherein the active metal is platinum.

10. The regenerated hydrocracking catalyst according to claim 7, wherein the active metal is platinum.

11. The regenerated hydrocracking catalyst according to claim 1, wherein the carbonaceous substance is obtained by calcining carbonaceous substances on the used hydrocracking catalyst that were produced and deposited during hydrocracking.

12. The regenerated hydrocracking catalyst according to claim 1, wherein the carbonaceous substance is produced and deposited on the used hydrocracking catalyst during hydrocracking.

13. A process for producing a regenerated hydrocracking catalyst comprising a catalyst support comprising a zeolite and an amorphous composite metal oxide having solid acidity, and at least one active metal supported by the catalyst support and selected from noble metals of Group 8 to Group 10 in the periodic table, comprising:
calcining or heating a used catalyst comprising an organic compound by raising temperature at a rate of 1 to 50° C./h up to a predetermined temperature to produce a carbonaceous substance comprising a carbon atom in the regenerated hydrocracking catalyst in an amount of 0.05 to 1 by mass in terms of the carbon atom.

14. A process for producing a regenerated hydrocracking catalyst comprising a catalyst support comprising a zeolite and an amorphous composite metal oxide having solid acidity, and at least one active metal supported by the catalyst support and selected from noble metals of Group 8 to Group 10 in the periodic table, comprising: calcining a used catalyst, which comprises a carbonaceous substance that is produced and deposited during hydrotreating and/or a carbonaceous substance that is produced by carbonization of a hydrocarbon contained in the used catalyst, such that the regenerated catalyst comprises a carbonaceous substance comprising a carbon atom in an amount of 0.05 to less than 0.5% by mass in terms of the carbon atom.

15. The regenerated hydrocracking catalyst according to claim 1, wherein the regenerated hydrocracking catalyst contains 0.05 to less than 0.4% by mass of a carbonaceous substance in terms of carbon atoms based on the entire mass of the catalyst.

16. The regenerated hydrocracking catalyst according to claim 1, wherein the regenerated hydrocracking catalyst contains 0.05 to 0.2% by mass of a carbonaceous substance in terms of carbon atoms based on the entire mass of the catalyst.

* * * * *